United States Patent [19]
Iida et al.

[11] Patent Number: 5,929,959
[45] Date of Patent: Jul. 27, 1999

[54] LIQUID-CRYSTAL DISPLAY PANEL

[75] Inventors: Takayasu Iida; Makoto Watanabe, both of Tokyo, Japan

[73] Assignee: NEC Corporation, Tokyo, Japan

[21] Appl. No.: 08/914,327

[22] Filed: Aug. 19, 1997

[30] Foreign Application Priority Data

Aug. 20, 1996 [JP] Japan .................................. 8-218731

[51] Int. Cl.$^6$ .............................................. G02F 1/1339
[52] U.S. Cl. .......................................... 349/154; 349/153
[58] Field of Search ...................................... 349/154, 153

[56] References Cited

U.S. PATENT DOCUMENTS

| | | | |
|---|---|---|---|
| 4,106,860 | 8/1978 | Kaufmann | 350/343 |
| 4,277,143 | 7/1981 | Pauli et al. | 350/334 |
| 5,556,670 | 9/1996 | Mihara et al. | 349/153 |
| 5,684,555 | 11/1997 | Shiba et al. | 349/149 |

FOREIGN PATENT DOCUMENTS

| | | |
|---|---|---|
| H1-265230 | 10/1989 | Japan . |
| 2-302730 | 12/1990 | Japan . |
| 4-217228 | 8/1992 | Japan . |

*Primary Examiner*—William L. Sikes
*Assistant Examiner*—Joanne Kim
*Attorney, Agent, or Firm*—Foley, Hoag & Eliot LLP

[57] ABSTRACT

A liquid-crystal display panel has a pair of transparent substrates for sandwiching liquid crystal. The outer periphery of the substrates are bonded together with an adhesive except for a liquid-crystal inlet. Electrodes disposed on both the substrates are electrically connected by a transfer electrode disposed at the liquid-crystal inlet. The transfer electrode includes first and second electrode sections disposed on first and second substrates, respectively, and a conductive paste for electrically connecting the first and second electrode sections together and for sealing the liquid crystal at the inlet.

19 Claims, 4 Drawing Sheets

LIQUID-CRYSTAL DISPLAY PANEL

BACKGROUND OF THE INVENTION (a) Field of the Invention

The present invention relates to a liquid-crystal display panel used in a liquid-crystal display device.

(b) Description of the Related Art

A liquid-crystal display panel is used in a liquid-crystal display device of a portable computer, for example, for providing a color or monochrome image. Referring to FIGS. 1 and 2 showing a top plan view and a cross-sectional view, respectively, of a conventional liquid-crystal display panel, liquid crystal 407 is sandwiched between a pair of transparent oblong substrates 401 and 403, on which a plurality of transparent pixel electrodes 402 arranged in a matrix and a transparent common electrode 404 are disposed, respectively.

A plurality of strip electrodes including scanning electrodes and signal electrodes are disposed on the lower substrate 401 for driving the pixel electrodes 402. A transfer electrode 409 is disposed at each corner region of the substrates 401 and 403 for providing conduction between the electrodes disposed on both the substrates 401 and 403. The peripheries of the lower substrate 401 and upper substrate 403 are bonded together by an adhesive 406 for sealing the liquid crystal 407, which is introduced in the space between the substrates 401 and 403 through a liquid-crystal inlet 410 disposed at a gap of the adhesive 406.

The inlet 410 is finally closed after introduction of the liquid crystal 407 by using a sealant or insulating paste. The adhesive 406 is selected from an organic adhesive and extends substantially along the oblong edge of the substrates 401 and 403. Each corner of the oblong substrates 401 and 403 is short-cut by an oblique line of the adhesive 406 for circumventing the location of the transfer electrode 409.

The circumvention of the transfer electrode 409 necessitates provision of a space between the peripheral adhesive 406 and transfer electrode 409 and a space between the peripheral adhesive 406 and the pixel electrodes 402, which retards reduction of the area for the liquid-crystal display panel.

In view of the above, Patent Publication No. JP-A-4 (1992)-17228 proposes use of a conductive paste for the peripheral adhesive 406 for conduction between the electrodes on both the substrates instead of the transfer electrode 409. This method, however, sometimes involves a short-circuit failure in the electrodes in the vicinity of the peripheral adhesive.

Patent Publication No. JP-A-2(1990)-302730 proposes a transfer electrode implemented by a part of peripheral adhesive which contains conductive spacers therein to provide conduction between the electrodes on both the substrates. In this technique, however, both printing steps are needed for peripheral adhesive and transfer electrode, both of which request printing boards therefor and accordingly increase fabrication steps and raise fabrication costs.

SUMMARY OF THE INVENTION

It is therefore an object of the present invention to provide a liquid- crystal display panel wherein the area of the peripheral circuit region can be reduced substantially without raising the fabrication costs therefor and without reducing the yield thereof.

The present invention provides a liquid-crystal display panel comprising first and second substrates disposed opposite to each other for defining a space and a liquid-crystal inlet communicated to the space, liquid crystal received in the space, a first electrode group disposed on the first substrate and including a plurality of transparent pixel electrodes arranged in a matrix, a transparent common electrode disposed on the second substrate for opposing the plurality of transparent pixel electrodes, a transfer electrode disposed at the liquid-crystal inlet for electrically connecting a part of the first electrode group and the common electrode.

In accordance with the present invention, the transfer electrode disposed at the liquid-crystal inlet does not require an additional space therefor, does not increase the fabrication steps or raise the fabrication cost, and does not cause a short-circuit failure between electrodes, to thereby provide a reliable liquid-crystal display panel with a reduced size and cost.

The above and other objects, features and advantages of the present invention will be more apparent from the following description, referring to the accompanying drawings.

PREFERRED EMBODIMENTS OF THE INVENTION

Figure 1:
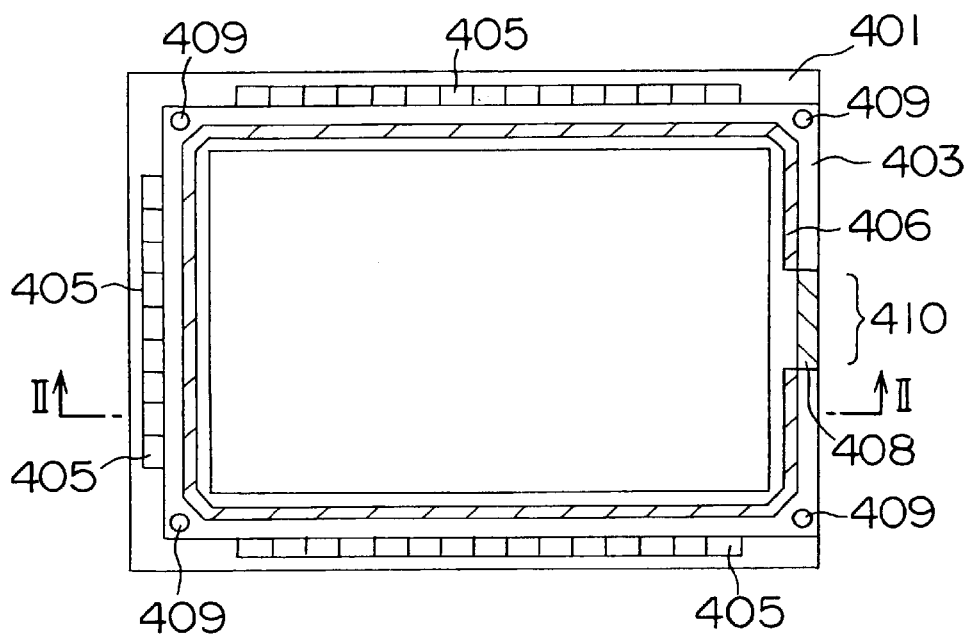
FIG. 1 is a top plan view of a conventional liquid-crystal display panel.
Figure 2:
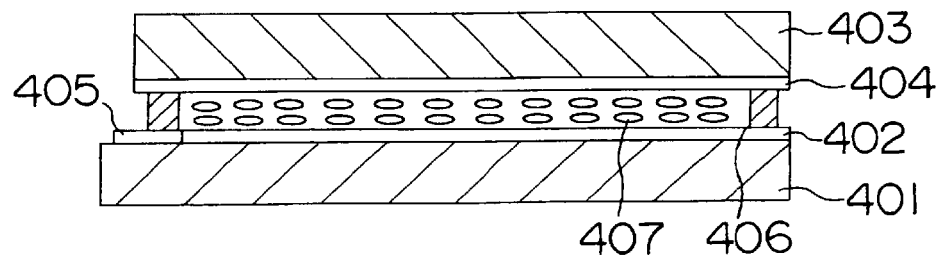
FIG. 2 is a cross-sectional view taken along line II—II in FIG. 1.

Now, the present invention is more specifically described with reference to accompanying drawings, wherein similar constituent elements are designated by the same or similar reference numerals.

Figure 3:
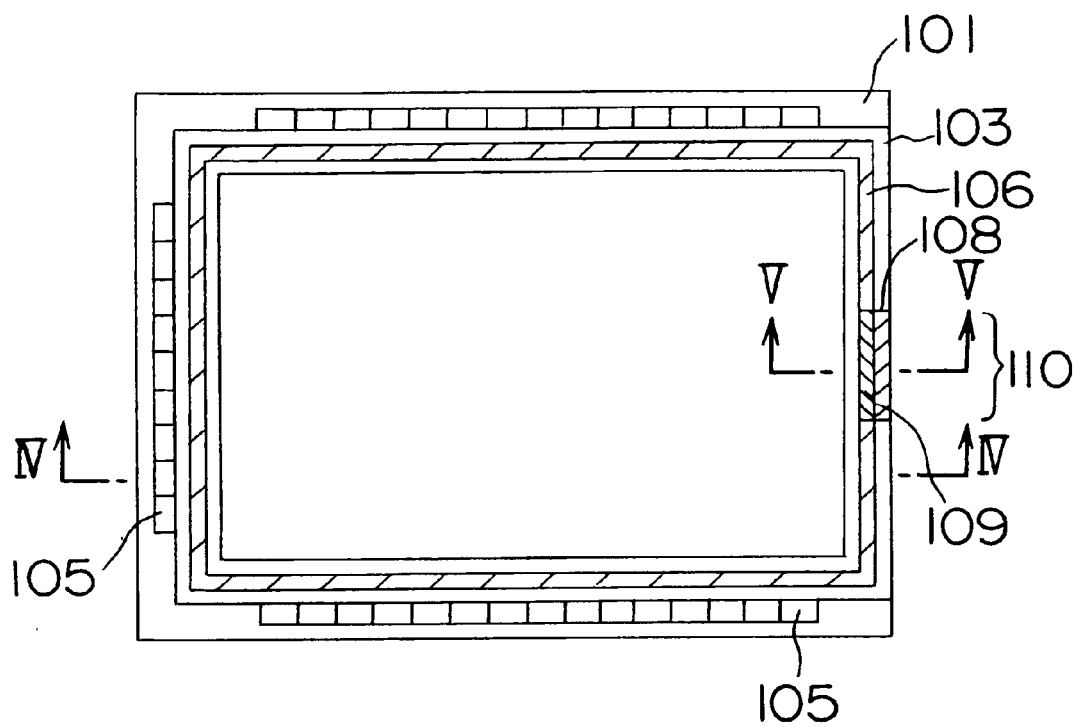
FIG. 3 is a top plan view of a liquid-crystal display panel according to a first embodiment of the present invention.
Figure 4:
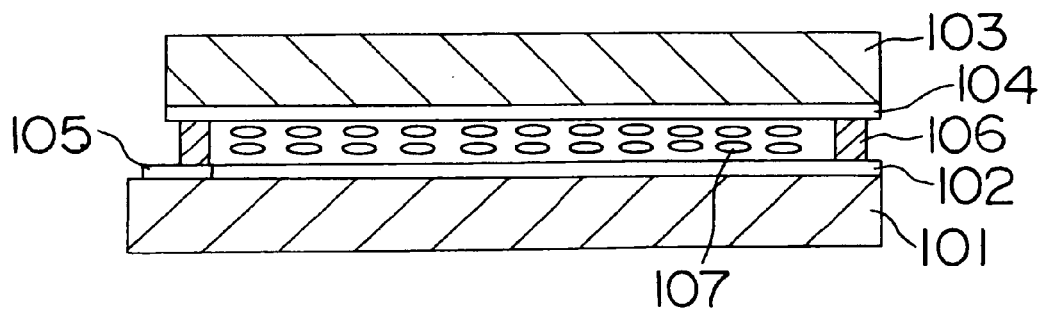
FIG. 4 is a cross-sectional view taken along line IV—IV in FIG. 3.

Referring to FIGS. 3 and 4, a liquid-crystal display panel according to a first embodiment of the present invention comprises a pair of glass substrates 101 and 103 opposed to each other, and liquid crystal 107 sandwiched between both the glass substrates 101 and 103. On the first glass substrate or lower glass substrate 101, there are provided a first group of electrodes including an array of transparent pixel electrodes 102 arranged in a matrix and a plurality of strip electrodes 105 extending horizontally and vertically for supplying driving signals to the pixel electrodes 102.

On the second glass substrate or upper glass substrate 103, there is provided a transparent common electrode 104 for opposing the pixel electrodes 102. Both the transparent substrate 101 and 103 are bonded together at the periphery thereof by peripheral adhesive 106 except at the liquid-crystal inlet 110, which is closed after introduction of the liquid crystal 107 by a conductive paste and an insulating paste 108.

Figure 5:
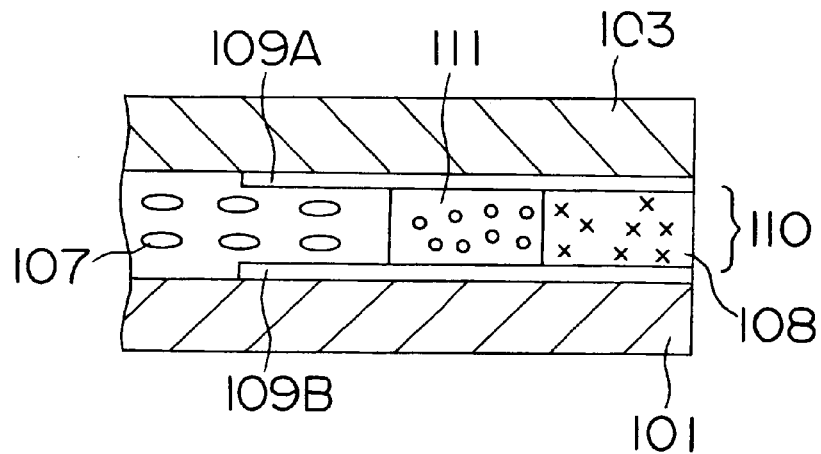
FIG. 5 is a cross-sectional view taken along line V—V in FIG. 3.

Referring to FIG. 5 showing the detail in the vicinity of the liquid-crystal inlet 110, the transfer electrode 109 comprises a first electrode section 109A formed on the upper substrate 103 and extending along the inlet 110, a second electrode section 109B formed on the lower substrate 101 and extending along the inlet 110, and a silver paste 111 applied at the inlet 110 between the first electrode section 109A and second electrode section 109B for electrically connecting them together. The first electrode section 109A is electrically connected to the common electrode 104, and the second electrode section 109B is connected to the first group of electrodes.

The liquid-crystal inlet 110 is sealed by the silver paste 111 at inner edge portion of the inlet 110 and also sealed by the insulating paste 108 at the outer edge portion of the inlet 110, thereby preventing the conductive silver paste 111 from flowing outside the peripheral edge of the substrates to cause a short-circuit failure in the electrodes.

Figure 6:
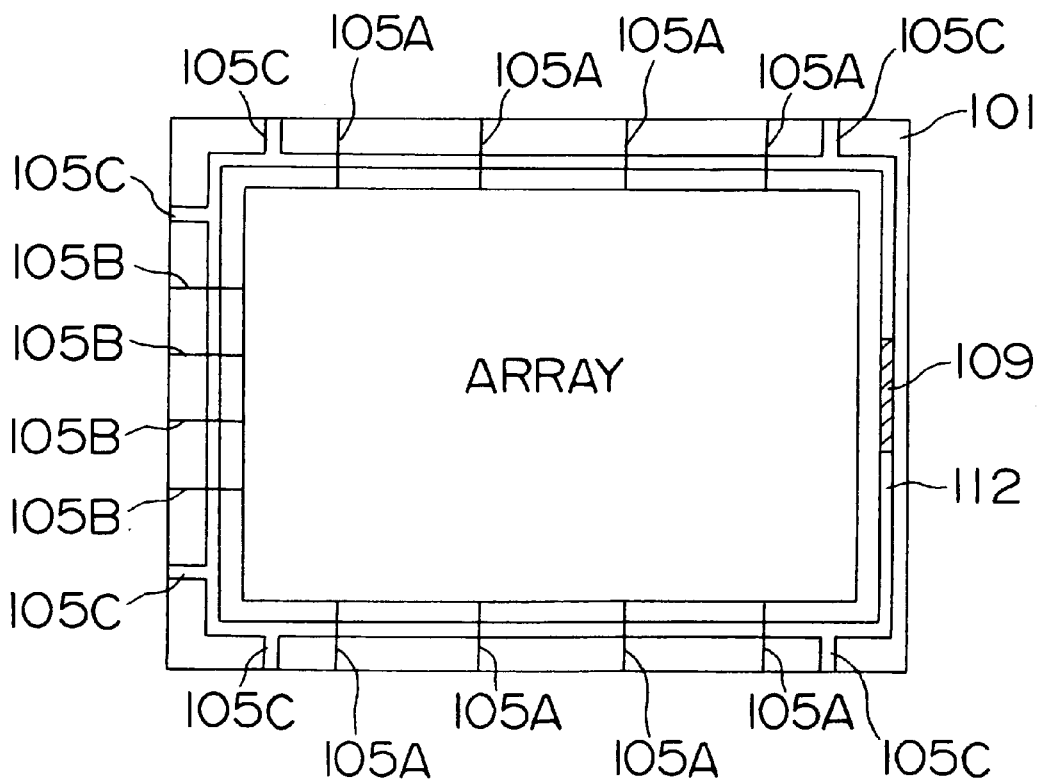
FIG. 6 is a detailed top plan view of the liquid-crystal display panel of FIG. 3, showing arrangement of the electrodes on the lower substrate.

Referring to FIG. 6 showing the arrangement of the electrodes on the periphery of the lower substrate 101 in the liquid-crystal display panel of the present embodiment, the first group of electrodes include a source line 112 which is connected to terminals 105C at respective corners of the substrate 101, a plurality of scanning electrodes 105B extending parallel to one other in the horizontal direction, and a plurality of signal electrodes 105A extending parallel to one another in the vertical direction. The common electrode 104 on the upper substrate 103 not shown in FIG. 6 is connected through the transfer electrode 109 and the source line 112 running along the periphery of the substrate 101 to the terminals 105C.

In the first embodiment, since the transfer electrode 109 is disposed at the liquid-crystal inlet 110, the transfer electrode 109 and peripheral adhesive 106 do not require a space in the vicinity of the corner region or periphery of the liquid-crystal display unit. Accordingly, the space area of the periphery of the liquid-crystal display panel can be reduced.

Moreover, in the present embodiment, conventional fabrication technique ca be used for introduction of the liquid crystal through the liquid-crystal inlet 110. Accordingly, the present invention does not increase the fabrication steps or raise the fabrication costs. A practical example fabricated according to the first embodiment did not show degradation in the image quality caused by a contact of the liquid crystal with the transfer electrode. The conductive paste of the transfer electrode disposed inside the insulating paste prevents the insulating paste from being pushed into the space for the liquid crystal.

Figure 7:
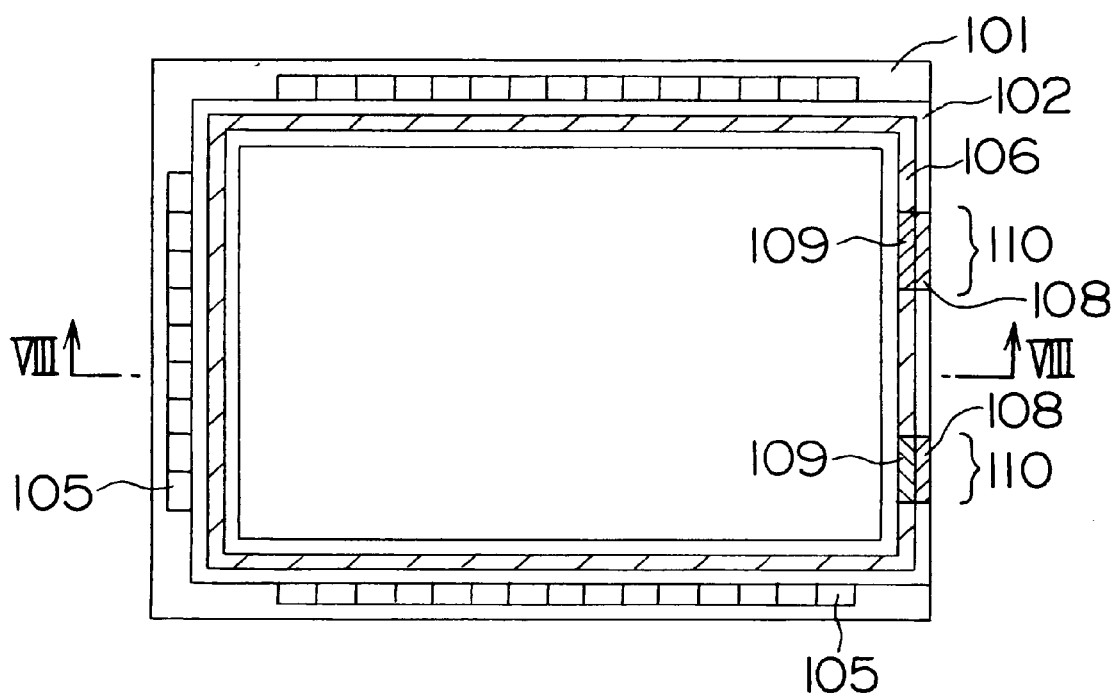
FIG. 7 is a top plan view of a liquid-crystal display panel according to a second embodiment of the present invention.
Figure 8:
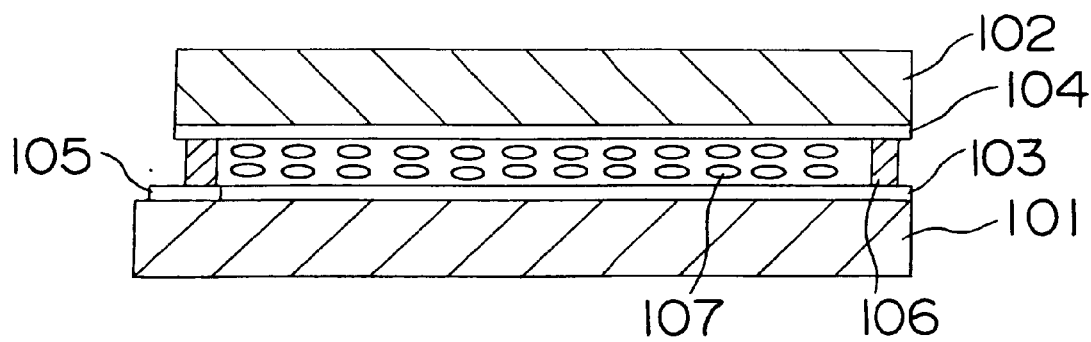
FIG. 8 is a cross-sectional view taken along line VIII—VIII in FIG. 7.

Referring to FIGS. 7 and 8, a liquid-crystal display panel according to a second embodiment of the present invention is similar to the first embodiment except that two of the liquid-crystal inlets 110 each having a transfer electrode 109 are disposed in the present embodiment. The liquid-crystal inlets 110 as disposed at separate locations achieve the advantage that the impedance between the common electrode 104 and the first group of electrodes on the lower substrate 101 is reduced to attain low cross-talk and improved image quality.

Since the above embodiments are described only for examples, the present invention is not limited to the above embodiments and various modifications or alterations can be easily made therefrom by those skilled in the art without departing from the scope of the present invention.

What is claimed is:

1. A liquid-crystal display panel comprising first and second substrates disposed opposite to each other for defining a space and a liquid-crystal inlet communicated to said space, liquid-crystal received in said space, a first electrode group disposed on said first substrate and including a plurality of transparent pixel electrodes arranged in a matrix, a transparent common electrode disposed on said second substrate for opposing said plurality of transparent pixel electrodes, a transfer electrode disposed at said liquid-crystal inlet for electrically connecting a part of said first electrode group and said common electrode, and an insulator disposed between said first and second substrates at an outer peripheral portion of said liquid-crystal inlet.

2. A liquid-crystal display panel as defined in claim 1 wherein said transfer electrode comprises first and second electrode sections disposed on said first and second substrates, respectively, and a conductive paste for electrically connecting said first and second electrode sections together and sealing said liquid crystal at said liquid-crystal inlet.

3. A liquid-crystal display panel as defined in claim 1 wherein said conductive paste is sealed by an insulator paste at the outer periphery of said liquid-crystal inlet.

4. A liquid crystal display panel as defined in claim 1 wherein said first and second substrates define a plurality of said liquid-crystal inlets, and said transfer electrode is disposed for each of said liquid-crystal inlets.

5. A liquid crystal display, comprising:
   (a) a first substrate having a plurality of first electrodes disposed thereon;
   (b) a second substrate, disposed opposite to said first substrate to form a space therebetween, said second substrate having at least one second electrode disposed thereon;
   (c) an inlet, disposed between said first and second substrates, said inlet being in communication with said space between said first and second substrates;
   (d) a first transfer electrode, formed substantially within said first inlet to electrically connect a subset of said plurality of first electrodes with said at least one second electrode; and
   (e) an insulator disposed between said first and second substrates at an outer peripheral portion of said first inlet.

6. A liquid crystal display, according to claim 5, further comprising:
   (f) a second inlet in communication with said space between said first and second substrates; and
   (g) a second transfer electrode, formed substantially within said second inlet to electrically connect the subset of said plurality of first electrodes with said at least one second electrode.

7. A liquid crystal display according to claim 5, wherein said insulator is an insulating paste.

8. A liquid crystal display, according to claim 6, wherein said first transfer electrode includes a first electrode section electrically connected to the subset of said plurality of first electrodes, a second electrode section electrically connected to said at least one second electrode, and a conducting paste electrically connected to said first and second electrode sections.

9. A liquid crystal display, according to claim 8, wherein said insulator includes an insulating paste.

10. A liquid crystal display according to claim 8 wherein the conducting paste includes silver.

11. A liquid crystal display comprising:
   (a) a first substrate having a plurality of first electrodes disposed thereon;

(b) a second substrate, disposed opposite to said first substrate to form a substantially sealed space therebetween, said second substrate having at least one second electrode disposed thereon;

(c) inlet means, for introducing liquid crystal to said space;

(d) transfer electrode means, disposed substantially within said inlet means, for electrically connecting a subset of said plurality of first electrodes with said at least one second electrode; and (e) insulator means disposed between said first and second substrates at an outer peripheral portion of said inlet means.

12. A liquid crystal display, according to claim 11, wherein said inlet means is formed by providing a gap in an adhesive disposed about peripheral portions of said first and second substrates.

13. A liquid crystal display, according to claim 11, wherein said insulator means includes an insulating paste.

14. A liquid crystal display, according to claim 11, wherein said transfer electrode means includes a first electrode section electrically connected to the subset of said plurality of first electrodes, a second electrode section electrically connected to said at least one second electrode, and a conductive paste electrically connected to said first and second electrode sections.

15. A liquid crystal display according to claim 14 wherein the conducting paste includes silver.

16. A method of forming a liquid crystal display, comprising:

(a) forming a space between a first substrate having a plurality of first electrodes and a second substrate having at least one second electrode;

(b) forming an inlet at a peripheral portion of the first and second substrates to introduce liquid crystal to said space;

(c) introducing a liquid crystal into the space through the inlet;

(d) electrically connecting a subset of the first electrodes to the at least second electrode by placing a transfer electrode substantially within the inlet; and (e) forming an insulator between said first and second substrates at an outer peripheral portion of the inlet.

17. A method according to claim 16, wherein forming an insulator includes providing an insulating paste.

18. A method according to claim 16, wherein placing the transfer electrode in the inlet includes sealing the inlet to cause the liquid crystal to remain within the space.

19. A method according to claim 18, wherein forming an insulator includes placing insulating paste at an outer peripheral portion of the inlet after sealing the inlet.

* * * * *